United States Patent
Hecht et al.

(10) Patent No.: US 10,987,743 B2
(45) Date of Patent: Apr. 27, 2021

(54) SLOTTING TOOL BODY HAVING INWARDLY OFFSET INSERT RECEIVING SLOT, ROTARY SLOT CUTTING TOOL HAVING SAME AND CUTTING INSERT

(71) Applicant: Iscar, Ltd., Tefen (IL)

(72) Inventors: Gil Hecht, Nahariya (IL); David Ben Harouche, Nahariya (IL)

(73) Assignee: Iscar, Ltd., Tefen (IL)

( * ) Notice: Subject to any disclaimer, the term of this patent is extended or adjusted under 35 U.S.C. 154(b) by 42 days.

(21) Appl. No.: 16/176,395

(22) Filed: Oct. 31, 2018

(65) Prior Publication Data

US 2019/0160555 A1 May 30, 2019

Related U.S. Application Data

(60) Provisional application No. 62/591,897, filed on Nov. 29, 2017.

(51) Int. Cl.
*B23C 5/22* (2006.01)
*B23C 5/00* (2006.01)
(Continued)

(52) U.S. Cl.
CPC ............ *B23C 5/006* (2013.01); *B23C 5/08* (2013.01); *B23C 5/109* (2013.01); *B23C 5/22* (2013.01);
(Continued)

(58) Field of Classification Search
CPC ....... B23C 2260/52; B23C 5/006; B23C 5/08; B23C 2210/161; B23D 61/06
See application file for complete search history.

(56) References Cited

U.S. PATENT DOCUMENTS 1,120,969 A * 12/1914 Petzold .................. B23D 61/06
83/845
4,738,570 A * 4/1988 Wertheimer ............ B23C 5/006
407/50
(Continued)

FOREIGN PATENT DOCUMENTS

| DE | 20 2015 106360 | 11/2015 | |
| DE | 202017101032 U1 * | 3/2017 | .......... B23C 5/2239 |
| WO | WO 2005/016583 | 2/2005 | |

OTHER PUBLICATIONS

English translation of DE 202017101032 U1, Feb. 2017 (Year: 2017).*

(Continued)

*Primary Examiner* — Alan Snyder
(74) *Attorney, Agent, or Firm* — Womble Bond Dickinson (US) LLP (57) ABSTRACT

A slotting tool body includes a disc-like cutter portion and a shank portion projecting rearwardly therefrom. The cutter portion includes a resilient clamping portion having a peripherally disposed insert receiving slot. The shank portion includes a peripherally disposed forward shank recess that is axially adjacent the cutter portion. A radially inward portion of the insert receiving slot merges in the rearward direction with the forward shank recess. A cutting insert is releasably and resiliently clamped in the insert receiving slot to form a rotary slot cutting tool. The cutting insert includes two cutting portions that each include a long and short insert lateral extension, the long insert lateral extension being longer than the short insert lateral extension. The longest insert lateral extensions are orated on opposite sides of the cutting insert.

27 Claims, 5 Drawing Sheets

(51) Int. Cl.
  *B23C 5/08* (2006.01)
  *B23C 5/10* (2006.01)
  *B23C 5/28* (2006.01)

(52) U.S. Cl.
  CPC .............. *B23C 5/2239* (2013.01); *B23C 5/28* (2013.01); *B23C 2200/0494* (2013.01); *B23C 2200/082* (2013.01); *B23C 2200/085* (2013.01); *B23C 2200/086* (2013.01); *B23C 2200/164* (2013.01); *B23C 2200/165* (2013.01); *B23C 2210/02* (2013.01); *B23C 2210/03* (2013.01); *B23C 2210/161* (2013.01); *B23C 2210/202* (2013.01); *B23C 2210/40* (2013.01); *B23C 2250/12* (2013.01)

(56) References Cited

U.S. PATENT DOCUMENTS

| | | |
|---|---|---|
| 5,059,068 A | 10/1991 | Scott |
| 5,836,723 A | 11/1998 | Von Haas et al. |
| 5,975,812 A | 11/1999 | Friedman |
| 6,116,823 A | 9/2000 | Mihic |
| 6,276,879 B1 | 8/2001 | Hecht |
| 6,571,451 B2 | 6/2003 | Satran et al. |
| 8,647,028 B2 | 2/2014 | Athad |
| 8,708,610 B2 | 4/2014 | Hecht |
| 8,708,611 B2 | 4/2014 | Marshansky |
| 8,834,075 B2 | 9/2014 | Choi et al. |
| 2008/0240874 A1 | 10/2008 | Nagaya et al. |
| 2013/0034394 A1 | 2/2013 | Hecht et al. |
| 2018/0290218 A1 | 10/2018 | Ericson |

OTHER PUBLICATIONS

International Search Report dated Apr. 11, 2019, issued in PCT counterpart application (No. PCT/IL2018/051159).
Written Opinion dated Apr. 11, 2019, issued in PCT counterpart application (No. PCT/IL2018/051159).

* cited by examiner

SLOTTING TOOL BODY HAVING INWARDLY OFFSET INSERT RECEIVING SLOT, ROTARY SLOT CUTTING TOOL HAVING SAME AND CUTTING INSERT

RELATED APPLICATIONS

This application claims priority to U.S. Provisional Patent Application No. 62/591,897, filed 29 Nov. 2017, the contents of which are incorporated by reference in their entirety.

FIELD OF THE INVENTION

The subject matter of the present application relates to rotary slot cutting tools having a slotting tool body with a disc-like cutter portion having a plurality of circumferentially disposed insert receiving pockets, for releasably retaining a cutting insert therein, in general, and to such slotting tool bodies where the insert receiving pocket resiliently clamps the cutting insert therein, in particular.

BACKGROUND OF THE INVENTION

Rotary slot cutting tools can have a slotting tool body that has a disc-like cutter portion and a shank portion that extends perpendicular to the disc-like cutter portion. The disc-like cutter portion can be provided with a plurality of circumferentially disposed insert, receiving pockets for retaining a cutting insert therein. The cutting insert can be retained in the insert receiving pocket by a retaining screw. Examples of such rotary cutting tools are disclosed in, for example, U.S. Pat. Nos. 6,571,451 and 8,834,075.

In other rotary slotting cutting tools, the cutting insert can be retained in the insert receiving pocket by a resilient clamping member. Examples of such rotary cutting tools are disclosed in, for example, U.S. Pat. Nos. 6,116,823 and 8,708,610, where the cutting inserts are single ended. Alternatively, the cutting insert can also be double-ended as shown in U.S. Pat. No. 5,059,068.

In yet other rotary slotting cutting tools, in particular for internal grooving in small holes it can be preferable to use disc shaped solid carbide slotting heads having a plurality of cutting edges. Examples of such rotary cutting tools are disclosed in, for example, U.S. Pat. Nos. 6,276,879 and 8,708,611. However, such slotting heads are relatively expensive to manufacture and if one cutting edges is damaged the entire slotting head needs to be replaced.

SUMMARY OF THE INVENTION

In accordance with a first aspect of the subject matter of the present application there is provided a slotting tool body, having a body central axis that defines opposite forward and rearward directions and about which the slotting tool body is rotatable in a rotational direction, the slotting tool body comprising:
  a disc-like cutter portion comprising a resilient clamping portion having a peripherally disposed insert receiving slot; and
  a shank portion projecting rearwardly from the cutter portion, the shank portion comprising a shank peripheral surface which extends circumferentially about the body central axis and a forward shank recess recessed in, and opening out to, the shank peripheral surface adjacent to the cutter portion; wherein:
    a radially inward portion of the insert receiving slot merges in the rearward direction with the forward shank recess.

In accordance with a second aspect of the subject matter of the present application there is provided a rotary slot cutting tool comprising:
  a slotting tool body of the type described above; and
  a cutting insert, releasably and resiliently clamped in the insert receiving slot.

In accordance with a third aspect of the subject matter of the present application there is provided a cutting insert, longitudinally elongated in a direction defining an insert longitudinal axis, comprising:
  opposing insert upper and lower surfaces and an insert peripheral surface extending therebetween, the insert peripheral surface comprising two opposing insert end surfaces connecting the insert upper and lower surfaces and two opposing insert side surfaces also connecting the insert upper and lower surfaces;
  an insert longitudinal plane containing the insert longitudinal axis, passing between the insert side surfaces, and intersecting the insert upper and lower surfaces and also intersecting the opposite insert end surfaces; and
  two cutting portions located at opposite ends of the cutting insert, each comprising a cutting edge formed at the intersection of the insert upper surface and one of the two insert end surfaces; wherein:
    each insert cutting portion comprises two insert lateral extensions which project laterally from opposite sides of the cutting insert in a direction away from the insert longitudinal plane, and upon which the cutting edge extends;
    the two insert lateral extensions comprise a wide and narrow insert lateral extension, the wide insert lateral extension being longer than the narrow insert lateral extension in a direction perpendicular to the insert longitudinal plane; and
    the wide insert lateral extensions are located on opposite sides of the insert longitudinal plane.

In accordance with a fourth aspect of the subject matter of the present application there is provided a slotting tool body, having a body central axis that defines opposite forward and rearward directions and about which the slotting tool body is rotatable in a rotational direction, the slotting tool body comprising:
  a disc-like cutter portion comprising a resilient clamping portion having a peripherally disposed insert receiving slot; and
  a shank portion projecting rearwardly from the cutter portion, the shank portion comprising a shank peripheral surface which extends circumferentially about the body central axis and a forward shank recess recessed in, and opening out to, the shank peripheral surface adjacent to the cutter portion; wherein:
    in a forward view of the slotting tool body, in a direction along the body central axis, the shank portion is partially visible through the insert receiving slot.

It is understood that the above-said is a summary, and that features described hereinafter may be applicable in any combination to the subject matter of the present application, for example, any of the following features may be applicable to the slotting tool body and the rotary slot cutting tool and the cutting insert:
  The cutter portion and the shank portion can be integrally formed so that the slotting tool body has a unitary, one-piece construction.

The clamping portion can further comprise a resilient clamping member and a lower jaw member which oppose each other and are spaced apart from one another by the insert receiving slot, the resilient clamping member being arranged rotationally ahead of the lower jaw member and configured to resiliently retain a cutting insert in the insert receiving slot.

The resilient clamping member can be axially adjacent the forward shank recess.

The shank portion can comprise a peripherally disposed non-recessed forward shank portion that can be circumferentially adjacent the forward shank recess and axially adjacent the cutter portion.

The cutter portion can further comprise at least one additional resilient clamping portion to form a plurality of clamping portions that are angularly spaced apart from each other. The shank portion can further comprise at least one additional forward shank recess to form a plurality of forward shank recesses that are angularly spaced apart from each other. The shank portion can further comprise at least one additional non-recessed forward shank portion to form a plurality of non-recessed forward shank portions that are angularly spaced apart from each other, each non-recessed forward shank portion being located between two circumferentially adjacent forward shank recesses. A radially inward portion of each insert receiving slot can merge in the rearward direction a respective forward shank recess.

In a direction along the body central axis;
an imaginary radius line extending between the body central axis and a furthest portion on the non-recessed forward shank portion defines a shank portion radius of a shank portion circle that is centered at the body central axis and that has a shank portion diameter; and
the cutter portion defines a circumscribed cutter portion circle that is centered at the body central axis and that has a cutter portion diameter.

In a direction along the body central axis, the shank portion circle can intersect the insert receiving slot.

The insert receiving slot can be defined by an elongated slot peripheral surface comprising a slot lower jaw abutment surface located on the lower jaw member. In a direction along the body central axis, the shank portion circle intersects the slot lower jaw abutment surface.

The slot peripheral surface can further comprise a slot clamping member abutment surface located on the resilient clamping member. In a direction along the body central axis, the slot clamping member abutment surface can be located radially outside the shank portion circle.

The slot peripheral surface can further comprise a slot radial stop surface located circumferentially between the slot clamping member abutment surface and the slot lower jaw abutment surface. In a direction along the body central axis, the slot radial stop surface can be located radially inside the shank portion circle.

The forward shank recess can further comprise a peripherally disposed recess outer gap defined by a forwardly facing recess outer base surface and a recess outer peripheral surface extending transversely thereto, the recess outer base surface and each end of the recess outer peripheral surface intersecting the shank peripheral surface.

The forward shank recess can comprise a recess inner gap defined by a forwardly facing recess inner base surface and a recess inner peripheral surface extending transversely thereto. The recess inner base surface can intersect the recess outer peripheral surface. Each end of the recess inner peripheral surface can intersect the recess outer peripheral surface.

The recess outer gap can be formed by a circumferential groove that extends in the circumferential direction.

In a direction along the body central axis, the recess outer peripheral surface can be concavely curved and defined by a recess outer peripheral radius.

In a side view of the slotting tool body, the recess outer peripheral surface can be concavely curved and defined by a peripheral side radius.

The cutting insert can be longitudinally elongated in a direction defining an insert longitudinal axis, the cutting insert can comprise:
opposing insert upper and lower surfaces and an insert peripheral surface extending therebetween, the insert peripheral surface comprising two opposing insert end surfaces connecting the insert upper and lower surfaces and two opposing insert side surfaces also connecting the insert upper and lower surfaces;
an insert longitudinal plane containing the insert longitudinal axis, passing between the insert side surfaces, and intersecting the insert upper and lower surfaces and also intersecting the opposite insert end surfaces; and
a cutting portion located at one end of the cutting insert, the cutting portion comprising a cutting edge formed at the intersection of the insert upper surface and one of the two insert end surfaces; wherein:
the insert end surface opposite the cutting portion comprises an insert recessed portion comprising an insert key surface which is closer to the insert lower surface than to the insert upper surface, the insert key surface being configured for abutment by a displacement prong of a key used for extracting the cutting insert from the insert receiving slot.

In a side view of the cutting insert, the insert key surface can be concavely curved.

The insert key surface can be located entirely below an insert median plane that extends midway between the insert upper and lower surfaces and contains the insert longitudinal axis.

The insert end surface opposite the cutting portion can further comprise an insert stop surface which can be closer to the insert upper surface than to insert lower surface, the insert stop surface being planar.

The cutting insert can comprise an additional cutting portion forming two cutting portions, the two cutting portions being formed at opposite ends of the cutting insert.

Each insert cutting portion can comprise two insert lateral extensions which project laterally from opposite sides of the cutting insert in a direction away from the insert longitudinal plane, and upon which the cutting edge extends. The two insert lateral extensions can comprise a wide and a narrow insert lateral extension, the wide insert lateral extension being longer than the narrow insert lateral extension in a direction perpendicular to the insert longitudinal plane. The wide insert lateral extensions can be located on opposite sides of the insert longitudinal plane.

The two cutting portions can comprise an active cutting portion and a non-active cutting portion, the cutting edge of the active cutting portion being located beyond the radial extent of the cutter portion. The wide insert lateral extension of the active cutting portion can be the axially forwardmost of the two insert lateral extensions with respect to the axial direction.

The insert receiving slot can comprise a slot insert portion defined by an insert profile of the cutting insert in a direction along the body central axis. A radially inward portion of the slot insert portion can merge in the rearward direction with the forward shank recess.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
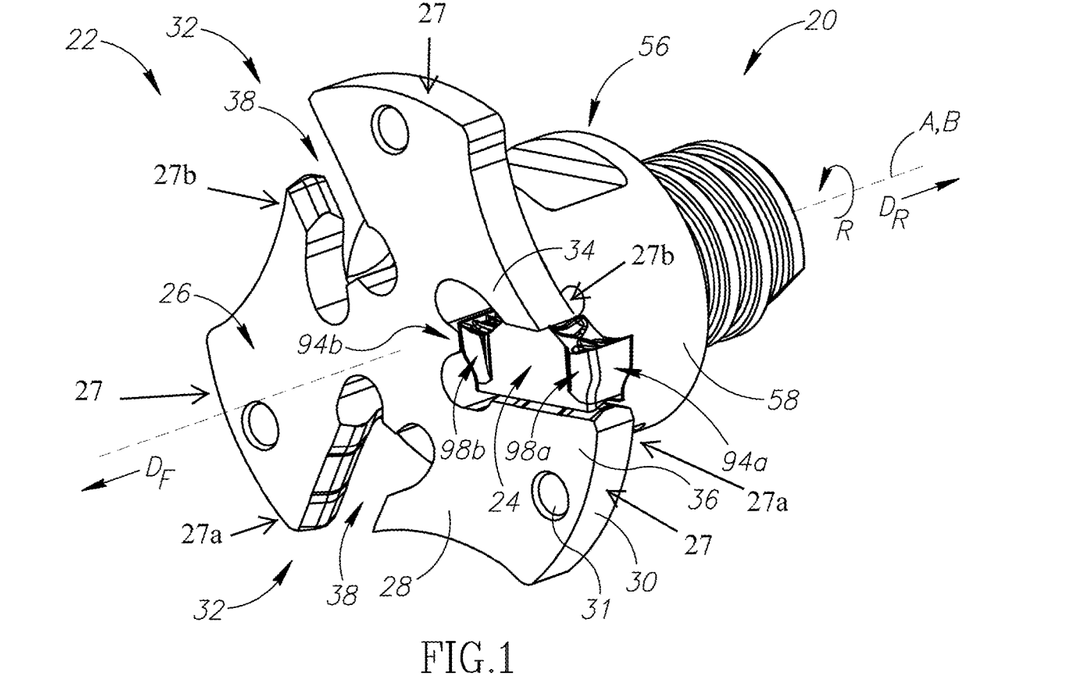
FIG. 1 is a forward perspective view of a rotary slot cutting tool, with a cutting insert resiliently clamped in an insert receiving slot, in accordance with the present application.
Figure 2:
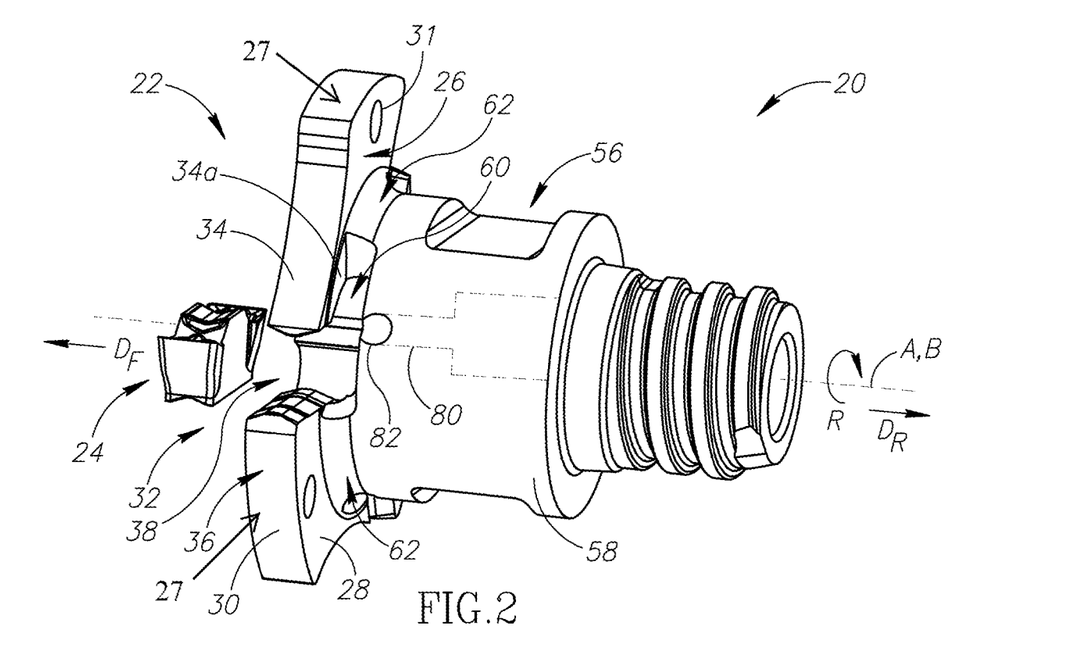
FIG. 2 is an exploded rearward perspective view of the rotary slot cutting tool shown in FIG. 1.

Attention is first drawn to FIGS. 1 and 2, showing a rotary slot cutting tool 20, depicting an aspect of the present application, having a tool central axis A, suitable for slotting cutting operations. The rotary slot cutting tool 20 may exhibit rotational symmetry about the tool central axis A. The rotary slot cutting tool 20 has a slotting tool body 22 which can be typically made from steel. The rotary slot cutting tool 20 has a cutting insert 24 which can be typically made from cemented carbide. The cutting insert 24 is releasably attached to the slotting tool body 22.

It is noted that the term "rotary slot cutting tool" as used herein may be replaced with other terms applicable in the metal cutting field for such cutting tools, for example, "slotting cutter", "slot milling cutter", "slitting cutter", "grooving cutter", "slot mill cutter", "groove milling cutter", "side milling cutter", "disc milling cutter", and the like.

Figure 3:
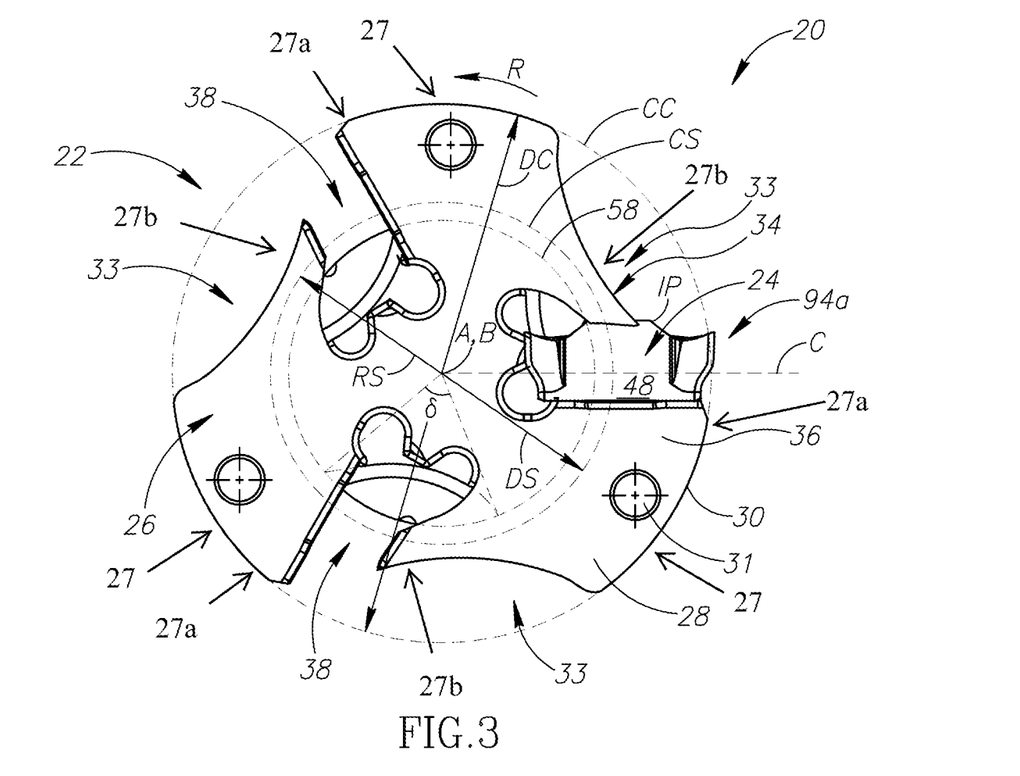
FIG. 3 is a forward view of a slotting tool body in FIG. 1.
Figure 4:
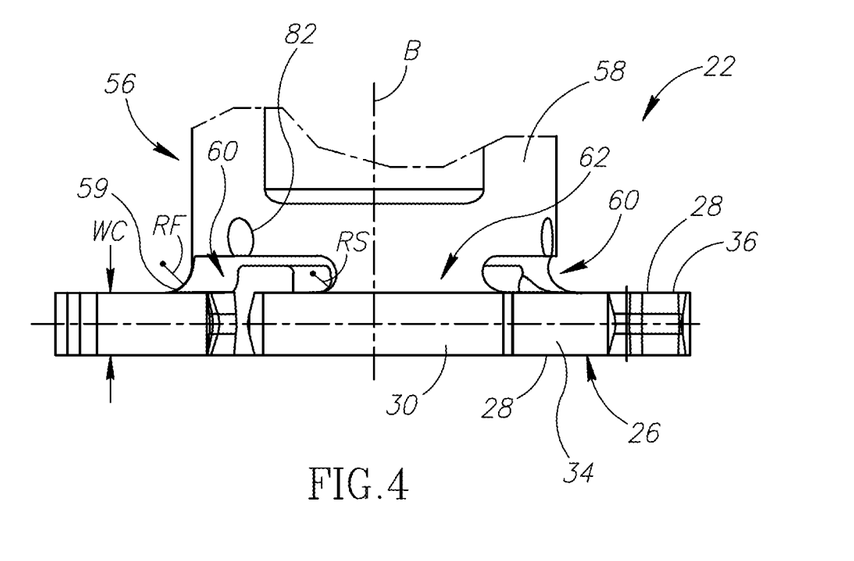
FIG. 4 is a side view of the slotting tool body shown in FIG. 3.

Reference is now made also to FIGS. 3 and 4, showing another aspect of the subject matter of the present application, relating to the slotting tool body 22. The slotting tool body 22 has a body central axis B that is co-incident with the tool central axis A. The body central axis B defines opposite forward and rearward directions $D_F$, $D_R$. The body central axis B forms an axis of rotation about which the slotting tool body 22 is rotatable in a rotational direction R.

It should be appreciated that use of the terms "forward" and "rearward" throughout the description and claims refer to a relative position in a direction of the body central axis B downwardly and upwardly, respectively, in FIG. 4. Moreover, the terms "axial" and "radial" are with respect to the tool central axis B, unless specified otherwise.

As shown in FIG. 3, the slotting tool body 22 includes a disc-like cutter portion 26. The cutter portion 26 includes two opposing cutter portion side surfaces 28 and a cutter portion peripheral surface 30 that extends between the cutter portion side surfaces 28. The cutter portion peripheral surface 30 extends circumferentially about the body central axis B. The body central axis B intersects the two cutter portion side surfaces 28 at a central portion thereof. In a forward view of the slotting tool body 22, in a direction along the body central axis B (i.e. FIG. 3), the cutter portion 26 defines a circumscribed cutter portion circle CC that is centered at the body central axis B and that has a cutter portion diameter DC.

As shown in FIG. 4, in the axial direction, measured between the two cutter portion side surfaces 28, the cutter portion 26 has a cutter portion width WC. In accordance with some embodiments of the subject matter of the present application, the two cutter portion side surfaces 28 can be planar and perpendicular to the body central axis B. The cutter portion 26 can include a pivot prong hole 31, for receiving a pivot prong 51b of a key 52 when detaching the cutting insert 24 from the cutter portion 26, as discussed later in the description.

The cutter portion 26 includes a clamping portion 32. In accordance with some embodiments of the subject matter of the present application, the cutter portion 26 can further include at least one additional clamping portion 32 to form a plurality of clamping portions 32 that are angularly spaced apart from each other. In the embodiment seen in FIGS. 1-4 the cutter 32, each clamping portion 32 formed between an adjacent pair of cutter sectors 27. It is understood in the following description that any feature that relates to a single clamping portion 32 can also relate to the other clamping portions 32 if present. The plurality of clamping portions 32 can be arranged at the same axial position along the body central axis B in the forward-to-rearward direction. Each clamping portion 32 can have a chip gullet 33 at the cutter portion peripheral surface 30, so that the cutter portion 26 may not be completely circular in a forward view.

The clamping portion 32 includes a resilient clamping member 34 and a lower jaw member 36 which are opposite each other and spaced apart from one another by an insert receiving slot 38. That is to say, the insert receiving slot 38 is formed between the resilient clamping member 34 and the lower jaw member 36. As seen in FIG. 3, in the rotational direction R, the lower jaw member 36 is adjacent its insert receiving slot 38, while in a second circumferential direction opposite to the rotation direction R, the lower jaw member 36 is adjacent a resilient clamping member 34 belonging to a rotationally preceding clamping portion 32. The insert receiving slot 38 extends along an insert receiving slot axis C, such that in a forward view of the slotting tool body 22, the resilient clamping member 34 and the lower jaw member 36 are located on opposite sides of the insert receiving slot axis C. The resilient clamping member 34 is arranged rotationally ahead of the lower jaw member 36 and the insert receiving slot 38. Thus, as seen in FIGS. 1 and 3, each cutter sector 27 has a lower jaw member 36 formed at a rotationally leading end 27a thereof and a resilient clamping member 34 formed at a rotationally trailing end 27b thereof. Furthermore, the cutter sectors 27 are angularly spaced apart from one another by the insert receiving slot 38 of one of the clamping portions 32, with the resilient clamping member 34 of that clamping portion 32 formed on a rotationally leading cutter sector 27 and the lower jaw member 36 of that clamping portion formed on a rotationally trailing cutter sector 27. The resilient clamping member 34 is configured to resiliently retain the cutting insert 24 in the insert receiving slot 38. The resilient clamping member 34 is resiliently displaceable relative to the lower jaw member 36. In other words, the clamping portion 32 is resilient. It is noted that the clamping portion 32 is devoid of a resilience slot located rotationally forward of the resilient clamping member 34 as disclosed in U.S. Pat. Nos. 6,116,823 and 8,388,270.

Figure 5:
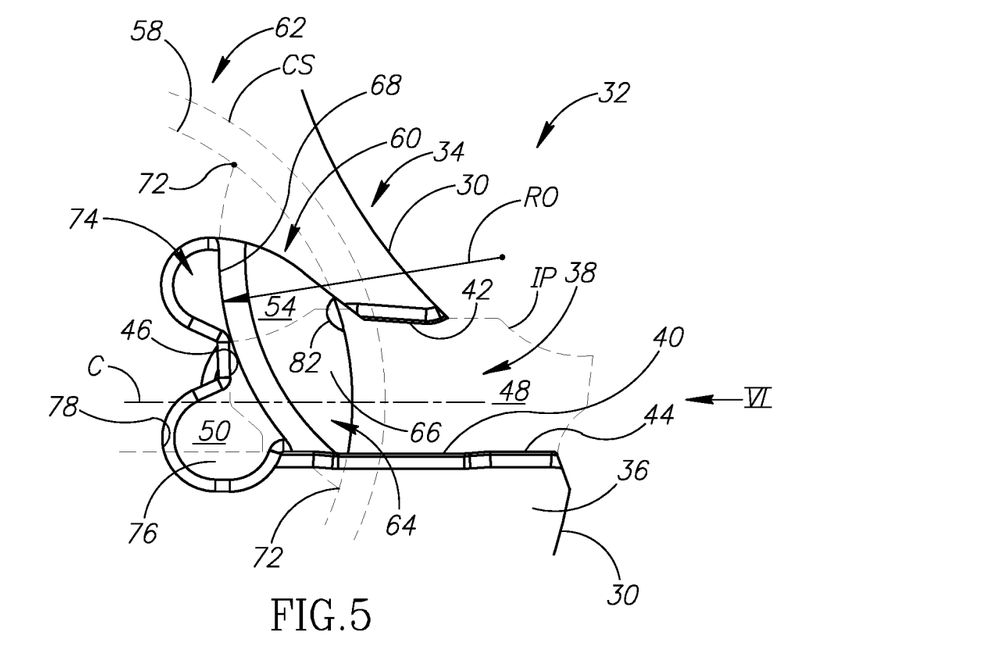
FIG. 5 is a side view of a clamping portion in FIG. 3, with an insert profile superimposed.

Reference is further made to FIG. 5, showing a side view of the clamping portion 32 (i.e. perpendicular to the insert receiving slot axis C), the insert receiving slot 38 opens out to the cutter portion peripheral surface 30. Thus, the insert receiving slot 38 is peripherally disposed. Reverting to FIG. 4, the insert receiving slot 38 opens out laterally on both sides to the cutter portion side surfaces 28. It is understood the context of "laterally" in reference to the insert receiving slot 38 means perpendicular to the insert receiving slot axis C, and thus generally in a direction parallel to the body central axis B.

The insert receiving slot 38 is defined by an elongated slot peripheral surface 40 having ends that extend to the cutter portion peripheral surface 30. The slot peripheral surface 40 extends between the two cutter portion side surfaces 28. The slot peripheral surface 40 includes a slot clamping member abutment surface 42 located on the resilient clamping member 34, for abutting a corresponding surface on the cutting insert 24. The slot peripheral surface 40 includes a slot lower jaw abutment surface 44 located on the lower jaw member 36, for abutting a corresponding surface on the cutting insert 24. The slot peripheral surface 40 includes a slot radial stop surface 46, for positioning the cutting insert 24 in an exact predetermined radial position. The slot radial stop surface 46 faces radially outwardly. In accordance with some embodiments of the subject matter of the present application, slot radial stop surface 46 can be located circumferentially between the slot clamping member abutment surface 42 and the slot lower jaw abutment surface 44.

Referring to FIG. 5, the insert receiving slot 38 includes a slot insert portion 48 defined by an insert profile IP of the cutting insert 24 in a direction along the body central axis B when releasably and resiliently clamped in the insert receiving slot 38. The insert receiving slot 38 includes a slot key portion 50 extending radially inwardly from the insert receiving slot 38. One purpose of the slot key portion 50 is to act as a stress relief groove (as is known in the art). However, the slot key portion 50 has a larger dimension than normal stress relief grooves so that it can also serve to receive a displacement prong 51a of the key 52 when extracting the cutting insert 24 from the insert receiving slot 38. Moreover, the slot key portion 50 is positioned further rotationally forward than would be normally required if its purpose was only as a stress relief groove. For example, the majority of the insert key portion 50 is located above an extension of the slot lower jaw abutment surface 44. This allows the displacement prong 51a to be able to abut an end of the cutting insert 24, while being located in the slot key portion 50. The insert receiving slot 38 includes a slot resilience portion 54, for providing the desired resilience to the resilient clamping member 34. The slot resilience portion 54 is located rotationally forward from the slot key portion 50.

Referring to FIGS. 2 and 4, the slotting tool body 22 includes a shank portion 56 that projects from the rearmost one of the cutter portion side surfaces 28. That is to say, the shank portion 56 projects rearwardly from the cutter portion 26. The shank portion 56 includes a shank peripheral surface 58 which extends circumferentially about the body central axis B. In accordance with some embodiments of the subject matter of the present application, the shank portion 56 can be integrally formed with the cutter portion 26 so that the slotting tool body 22 has a unitary, one-piece construction. i.e., the shank portion 56 and the cutter portion 26 are formed (e.g., machined) from a single continuous piece of material. The shank portion 56 can have a cylindrical basic shape. As seen in FIG. 4, the shank peripheral surface 58 can intersect the cutter side surface 28 at a shank fillet surface 59 that has a concave curvature. Said concave curvature can have a shank fillet radius RF that is greater or equal to 1 mm and less than or equal to 2 mm.

Figure 6:
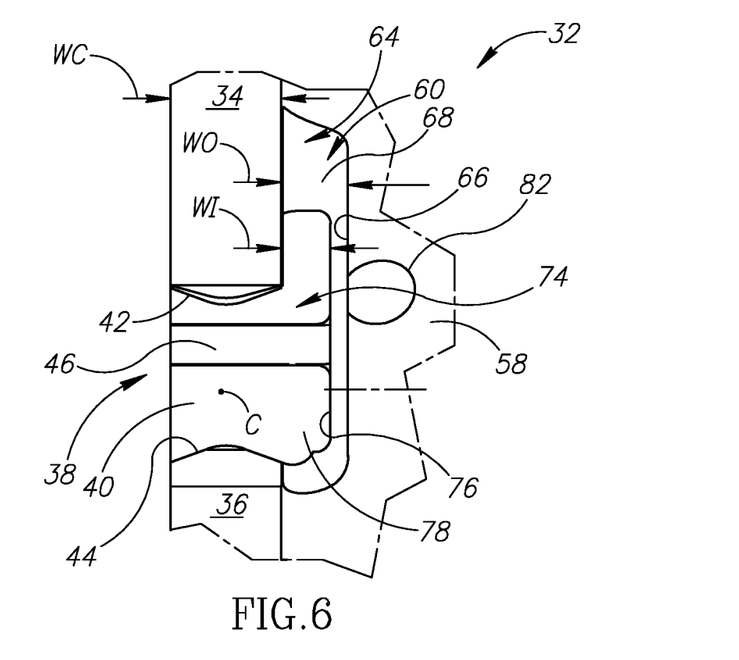
FIG. 6 is a front view of the clamping portion in FIG. 5, taken along the direction line "VI"

Reverting back to FIGS. 4 and 6, the shank portion 56 includes a forward shank recess 60 that is recessed in, and opens out to, the shank peripheral surface 58. That is to say, the forward shank recess 60 is peripherally disposed, and is radially recessed in the shank peripheral surface 58 proximate a forward end thereof. The forward shank recess 60 is axially adjacent the cutter portion 26. In accordance with some embodiments of the subject matter of the present application, the shank portion 56 can further include at least one additional forward shank recess 60 to form a plurality of forward shank recesses 60 that are angularly spaced apart from each other. It is understood in the following description that any feature that relates to a single forward shank recess 60 can also relate to the other forward shank recesses 60 if present.

In accordance with some embodiments of the subject matter of the present application, shank portion 56 can include a non-recessed forward shank portion 62 formed by a part of the shank peripheral surface 58 that is non-recessed. Like the forward shank recess 60, the non-recessed forward shank portion 62 is peripherally disposed. The non-recessed forward shank portion 62 can be circumferentially adjacent the forward shank recess 60 and axially adjacent the cutter portion 26. Thus, the forward shank recess 60 may not extend around the full circumferential extent of the shank portion 56 (i.e. may not have an angular extent of 360°). In a similar manner to the forward shank recess 60, in accordance with some embodiments of the subject matter of the present application, the shank portion 56 can further include at least one additional non-recessed forward shank portion 62 to form a plurality of non-recessed forward shank portions 62 that are angularly spaced apart from each other. The number of non-recessed forward shank portions 62 can match the number of forward shank recesses 60. Each non-recessed forward shank portion 62 can be located between two circumferentially adjacent forward shank recesses 60. That is to say, the forward shank recess 60 and the non-recessed forward shank portion 62 can alternate in a circumferential direction. It is understood in the foregoing description that any feature that relates to a single non-recessed forward shank portion 62 also relates to the other non-recessed forward shank portions 62 if present.

As seen in FIG. 3, in a direction along the body central axis B, an imaginary radius line that extends between the body central axis B and a furthest portion on the non-recessed forward shank portion 62 defines a shank portion radius RS of a shank portion circle CS that is centered at the body central axis B and that has a shank portion diameter DS. In the configuration with the plurality of non-recessed forward shank portions 62, the shank portion circle CS is a circumscribed circle defined by the plurality of non-recessed forward shank portions 62. It is noted that if the shank peripheral surface 58 has a fillet, as described above, the shank portion diameter DS can be different (e.g. greater) than the diameter of a circumscribed circle (not shown) defined by the shank portion 56 taken at a further rearward axial position.

In accordance with some embodiments of the subject matter of the present application, the resilient clamping member 34 can be axially adjacent the forward shank recess 60. That is to say, the free end of the resilient clamping member 34 is not connected to any part of the shank portion 56. As seen in FIG. 2, the forward shank recess 60 is axially rearward of the resilient clamping member 34 along the body central axis B, and a rearward facing surface 34a of the clamping member 34 faces the forward shank recess 60. At the forward shank recess 60, the resilient clamping member 34 is circumferentially cantilevered in a direction opposite the direction of rotation R, relative to a rotationally forward non-recessed forward shank portion 62. Advantageously, this allows the resilient clamping member to 34 to bend slightly when the cutting insert 24 encounters the work piece (along with the lower jaw member 36 and the cutting insert 24) in order to maintain a firm clamping force on the cutting insert 24. A radially inward portion of the lower jaw member 36 can be connected to the non-recessed forward shank portion 62.

Referring back to FIG. 5, in accordance with some embodiments of the subject matter of the present application, the forward shank recess 60 can include a recess outer gap 64 that is defined by a forwardly facing recess outer base surface 66 and a recess outer peripheral surface 68 that extends transversely to the recess outer base surface 66. The recess outer base surface 66 and each end of the recess outer peripheral surface 68 can intersect the shank peripheral surface 58. Thus, the recess outer gap 64 is peripherally disposed. The ends of the recess outer peripheral surface 68 intersect with the shank peripheral surface 58 at two peripheral intersections 72 that subtend a recess outer gap angle $\delta$ (indicated in FIG. 3) at the body central axis B. The recess outer gap angle $\delta$ can be in the range $60° \leq \delta \leq 80°$. The recess outer gap 64 can be formed by a circumferential groove that can extend in the circumferential direction. In a direction along the body central axis B, the recess outer peripheral surface 68 can be concavely curved and can be defined by a recess outer peripheral radius RO. In a side view of the slotting tool body 22 (perpendicular to the body central axis B), the recess outer peripheral surface 68 can be concavely curved and can be defined by a peripheral side radius RS. As seen in FIG. 6, showing a front view of the clamping portion 32 along the insert receiving slot axis C, in the axial direction, the recess outer gap 64 has a recess outer gap width WO, measured between the cutter portion 26 and the recess outer base surface 66. The recess outer gap width WO can be generally twice the peripheral side radius RS.

In accordance with some embodiments of the subject matter of the present application, the forward shank recess 60 can include a recess inner gap 74 that is defined by a forwardly facing recess inner base surface 76 and a recess inner peripheral surface 78 that extends transversely to the recess inner base surface 76. The recess inner base surface 76 can intersect the recess outer peripheral surface 68. Each end of the recess inner peripheral surface 78 can intersect the recess outer peripheral surface 68. Generally speaking, the recess inner gap 74 is radially inward from the recess outer gap 64. The slot peripheral surface 40 at the slot key portion 50 and the slot resilience portion 54 can each transition uniformly and continuously into the recess inner peripheral surface 78. Likewise, the slot radial stop surface 46 can transition uniformly and continuously into the recess inner peripheral surface 78. Thus, in a direction along the body central axis B, the slot peripheral surface 40 at the slot key portion 50 and the slot resilience portion 54 and the slot radial stop surface 46 can be aligned with the recess inner peripheral surface 78. As seen in FIG. 6, in the axial direction, the recess inner gap 74 has a recess inner gap width WI, measured between the cutter portion 26 and the recess inner base surface 76.

In accordance with some embodiments of the subject matter of the present application, the recess outer gap width WO can be greater or equal 1 mm and less than or equal to 2 mm ($1 \text{ mm} \leq \text{WO} \leq 2 \text{ mm}$). The recess inner gap width WI can be less than the recess outer gap width WO (WI<WO). That is to say, the recess inner gap 74 can be narrower than the recess outer gap 64 in the axial direction. The recess outer gap width WO can be less than the cutter portion width WC (WO<WC). That is to say, the recess outer gap 64 can be narrower than the cutter portion 26 in the axial direction.

A radially inward portion of the insert receiving slot 38 merges laterally on one side (i.e. the side of the insert receiving slot 38 that opens out to the rearmost one of the two cutter portion side surfaces 28, i.e., in the rearward direction $D_R$) with the forward shank recess 60. Thus, the insert receiving slot 38 is inwardly offset. Clearly, in the configuration with the plurality of clamping portions 32 and plurality of forward shank recesses 60, the radially inward portion of each insert receiving slot 38 merges in the rearward direction $D_R$ with a respective forward shank recess 60. In a forward view of the slotting tool body 22, in a direction along the body central axis B, the shank portion 56 is partially visible. More specifically, the shank portion 56 is partially visible through the slot insert portion 48. Thus, when the cutting insert 24 is releasably and resiliently clamped in the insert receiving slot 38, the forward shank recess 60 is partially hidden.

In accordance with some embodiments of the subject matter of the present application, in a direction along the body central axis B, the shank portion circle CS can intersect the insert receiving slot 38. In particular, the shank portion circle CS can intersect the slot insert portion 48. Thus, a radially inward portion of the slot insert portion 48 can merge in the rearward direction $D_R$ with the forward shank recess 60. Further in particular, the shank portion circle CS can intersect the slot lower jaw abutment surface 44. The slot clamping member abutment surface 42 can be located radially outside the shank portion circle CS. The slot radial stop surface 46 can be located radially inside the shank portion circle CS. The slot key and resilience portions 50, 54 can be located radially inside the shank portion circle CS.

Referring to FIGS. 2 and 6, in accordance with some embodiments of the subject matter of the present application, the shank portion 56 can include a shank coolant channel 80 that opens out to the shank peripheral surface 58 at a coolant channel exit 82. The coolant channel exit 82 can intersect the forward shank recess 60.

Figure 7:
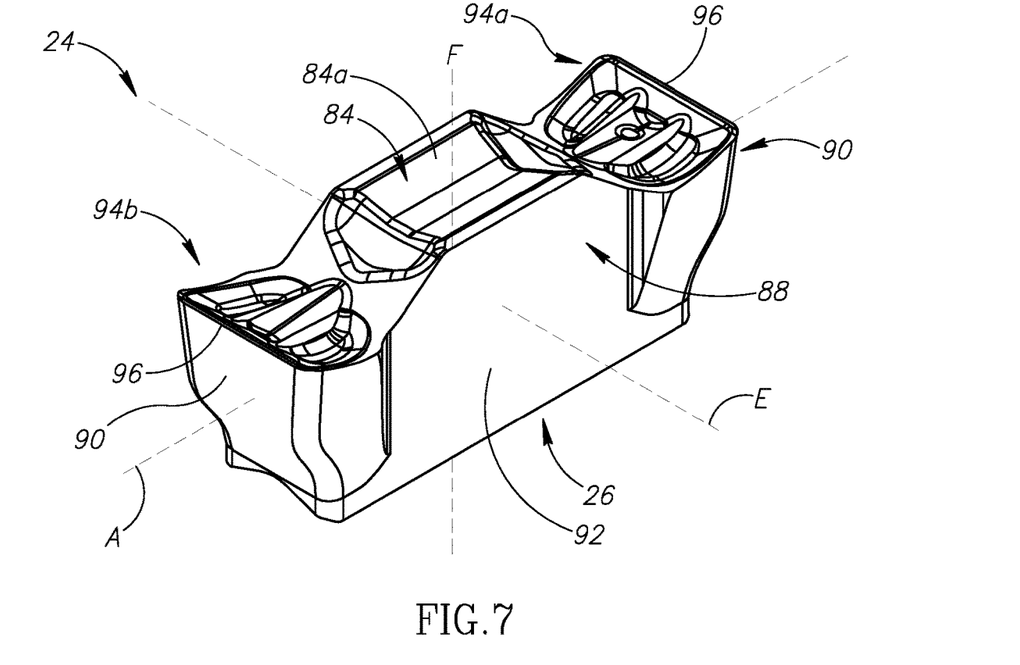
FIG. 7 is a perspective view of a cutting insert, in accordance with the present application.
Figure 8:
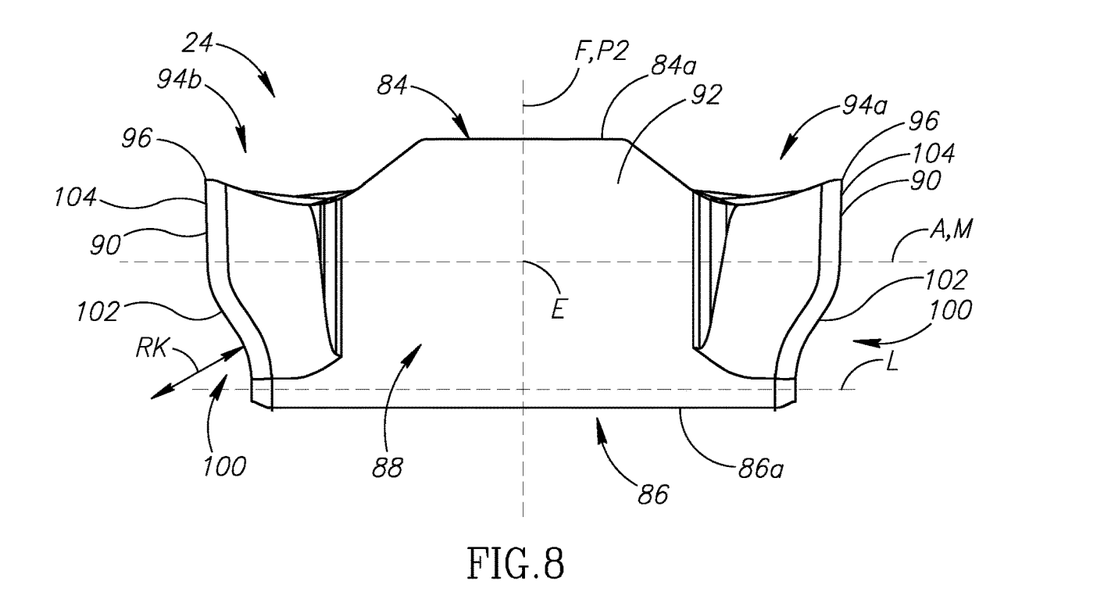
FIG. 8 is a side view of the cutting insert shown in FIG. 7.
Figure 9:
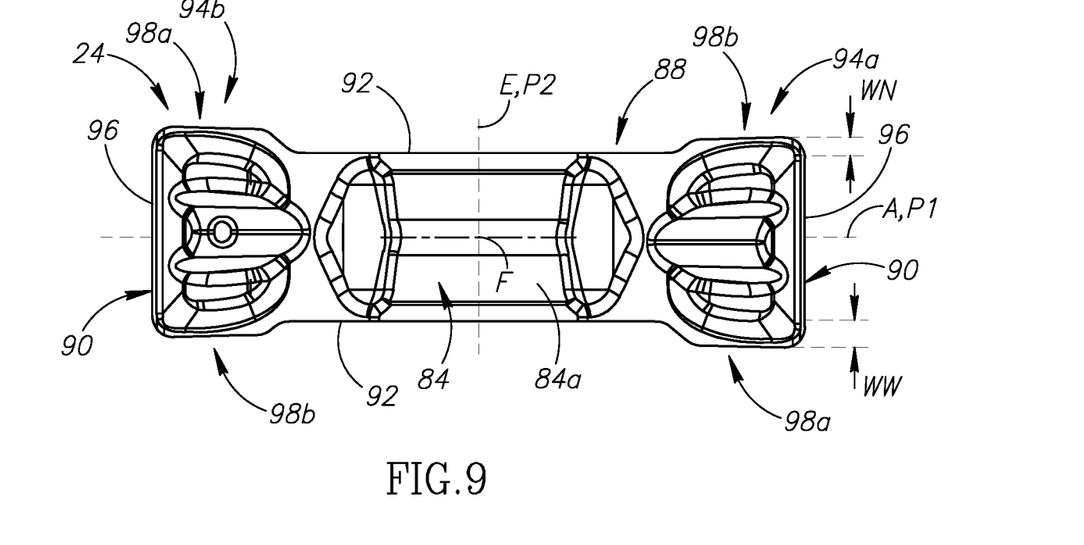
FIG. 9 is a top view of the cutting insert shown in FIGS. 7 and 8.
Figure 10:
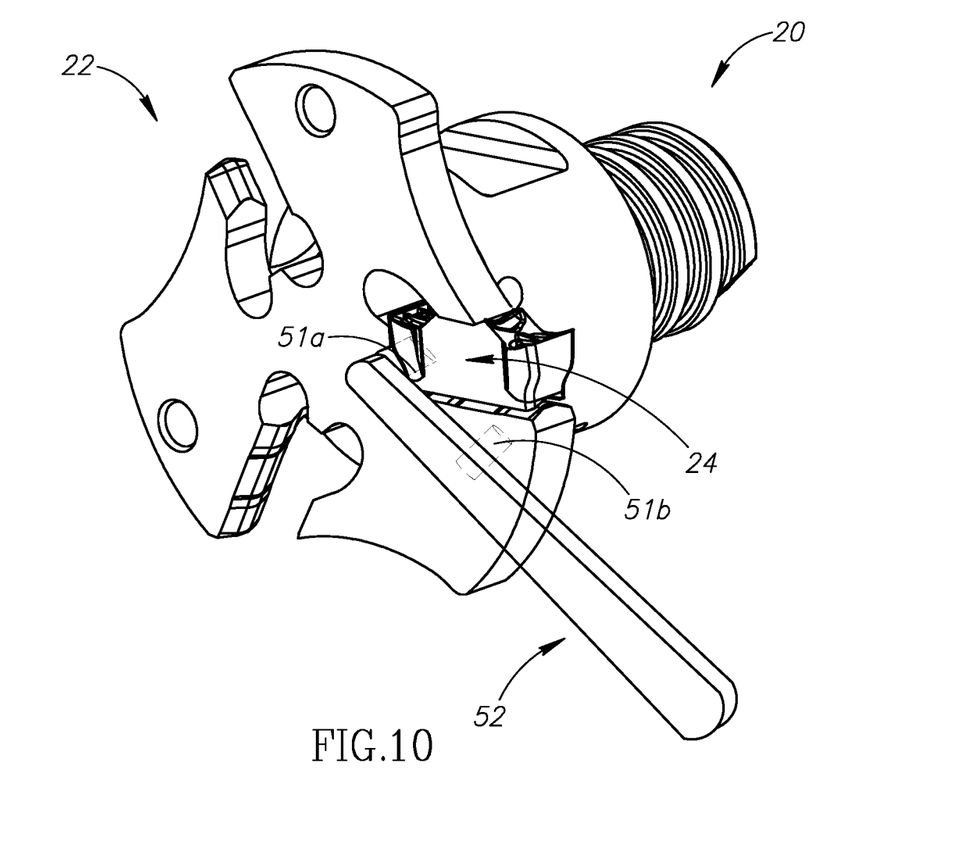
FIG. 10 is an analogous view shown in FIG. 1, prior to extraction of the cutting insert from the insert receiving slot with a key.

Reference is now made to FIGS. 7 to 9, showing another aspect of the subject matter of the present application, relating to the cutting insert 24. The cutting insert 24 is longitudinally elongated in a direction that defines an insert longitudinal axis A. The cutting insert 24 includes opposing insert upper and lower surfaces 84, 86 and an insert peripheral surface 88 that extends therebetween. The insert upper and lower surfaces 84, 86 include insert upper and lower abutment surfaces 84a, 86a, respectively, for abutment with corresponding surfaces on the insert receiving slot 38. In accordance with some embodiments of the subject matter of the present application, the insert lower surface 86 can contain a linear insert imaginary line L parallel to the insert longitudinal axis A. The insert upper and/or lower abutment surfaces 84a, 86a can have a prismatic shape that matches a shape of the slot clamping member abutment surface 42 and/or slot lower jaw abutment surface 44, respectively, in order to prevent displacement of the cutting insert 24 in the lateral direction of the cutting insert 24.

The insert peripheral surface 88 includes two opposing insert end surfaces 90 that connect the insert upper and lower surfaces 84, 86. The insert peripheral surface 88 includes two opposing insert side surfaces 92 that connect the insert upper and lower surfaces 84, 86. The insert longitudinal axis A intersects the insert end surfaces 90 and extends between the insert side surfaces 92 (FIG. 9) and also extends between insert upper and lower surfaces 84, 86 (FIG. 8). An insert lateral axis E extends perpendicular to the insert longitudinal axis A midway between the insert end surfaces 90 and intersects the two insert side surfaces 92, defining an insert lateral direction of the cutting insert 24. An insert central axis F extends perpendicular to the insert longitudinal axis A midway between the insert end surfaces 90 and intersects the insert upper and lower surfaces 84, 86. An insert median plane M contains the insert longitudinal axis A and the insert lateral axis E.

As seen in FIG. 9, the insert longitudinal axis A lays on an insert longitudinal plane P1 which contains the insert central axis F, passes midway between the insert side surface 92, and intersects both end surfaces 90. An insert central plane P2 perpendicular to the insert longitudinal plane P1 and also to the insert longitudinal axis A, contains the insert central axis F and the insert lateral axis E. In accordance with some embodiments of the subject matter of the present application, the cutting insert 24 can have 180° rotational symmetry about the inert central axis F. The cutting insert 24 may not be mirror symmetrical about the insert central plane P2 nor the insert longitudinal plane P1.

The cutting insert 24 includes a cutting portion 94a located at one end of the cutting insert 24. In accordance with some embodiments of the subject matter of the present application, the cutting insert 24 can further include one additional cutting portion 94b to form two cutting portions 94a, 94b, an active and a non-active cutting portion 94a, 94b. The two cutting portions 94a, 94b are located at opposite ends of the cutting insert 24. Stated differently, the cutting insert 24 is double-ended and can be indexed by 180° rotation about the insert central axis F (i.e. the active cutting portion 94a becomes the non-active cutting portion 94b and vice versa). The two cutting portions 94a, 94b can be identical. It is understood in the following description that any feature that relates to a single cutting portion 94a can also relate to the other cutting portion 94b if present.

The cutting portion 94a includes a cutting edge 96 formed at the intersection of the insert upper surface 84 and one of the two insert end surfaces 90. A portion of the insert end surface 90 adjacent the cutting edge 96 serves as a relief surface. Likewise, a portion of the insert upper surface 84 adjacent the cutting edge 96 serves as a rake surface. When the cutting insert 24 is releasably and resiliently clamped in the insert receiving slot 38, the cutting edge 96 of the active cutting portion 94a is located beyond the radial projection of the cutter portion 26 (i.e. beyond the circumscribed cutter portion circle CC). Preferably, such radial projection is no more than 1 mm. As seen in FIG. 9, the insert longitudinal plane P1 intersects the cutting edge 96, that is, the cutting edge 96 extends on both sides of the insert longitudinal plane P1.

Each insert side surface 92 bulges outwardly at the cutting portion 94a. That is to say, the cutting portion 94a includes two insert lateral extensions 98a, 98b which project laterally in a direction away from the insert longitudinal plane (i.e. perpendicular to the insert longitudinal plane P1), from opposite sides of the cutting insert 24. The cutting edge 96 extends onto the two insert lateral extensions 98a, 98b. In accordance with some embodiments of the subject matter of the present application, the two insert lateral extensions 98a, 98b can include a wide insert lateral extension 98a and a narrow insert lateral extension 98b, the width being measured in a direction perpendicular to the insert longitudinal plane P1. As seen in a top view of the cutting insert 24 (i.e. FIG. 9), measured in the lateral direction with respect to a non-bulging portion of the insert side surface 92, the wide insert lateral extension 98a has a wide extension width WW and the narrow insert lateral extension 98b has a narrow extension width WN, where the wide extension width WW can be greater than narrow extension width WN. Thus, the wide insert lateral extension 98a is longer than the narrow insert lateral extension 98b in the insert lateral direction, i.e., in the direction perpendicular to the insert longitudinal plane P1. Thus, the wide and narrow insert lateral extensions 98a, 98b are not identical. The wide insert lateral extension 98a can be longer than the narrow insert lateral extension 98b by between 1 mm and 2 mm, in the direction perpendicular to the insert longitudinal plane P1. When there are two cutting portions 94a, 94b at opposite ends 90 of the cutting insert 24, the wide insert lateral extension 98a can be located on opposite sides of the insert longitudinal plane P1. As seen in FIG. 1, the wide insert lateral extension 98a of the active cutting portion 94a can be the axially forwardmost of the two insert lateral extensions 98a, 98b with respect to the longitudinal direction of the cutting insert 24. Advantageously, this allows for face milling since the short insert lateral extension 98b of the non-active cutting portion 94b does not interfere with the work piece. When a double-ended cutting insert 24 is retained in an insert receiving slot 38, the wide lateral extension 98a belonging to the non-active cutting portion 94b located at the radially inner portion of the insert receiving slot 38, protrudes into the forward shank recess 60. Thus, one function of the forward shank recess 60 is to accommodate, and thus provide clearance for, the inactive lateral extension 98a.

The insert end surface 90 opposite the cutting portion 94a includes an insert recessed portion 100 having an insert key surface 102, configured for abutment with the displacement prong 51a of the key 52 used for extracting the cutting insert 24 from the insert receiving slot 38. The insert key surface 102 is closer to the insert lower surface 86 than to the insert upper surface 84. In accordance with some embodiments of the subject matter of the present application, the insert key surface 102 can be located entirely below the insert median plane M. In a side view of the cutting insert 24, perpendicular to the insert longitudinal axis A (i.e. FIG. 8), the insert key surface 102 can be concavely curved. It is understood that a side view of the cutting insert 24 is a view along (i.e., parallel to) the insert lateral axis E. Preferably, the insert key surface 102 can be defined by an insert key surface radius RK. The insert key surface radius RK can be greater than or equal to 0.6 mm and less than or equal to 1.0 mm. Such a configuration ensures smooth transfer of extraction forces from the displacement prong 51a to the cutting insert 24.

In accordance with some embodiments of the subject matter of the present application, the insert end surface 90 opposite the cutting portion 94a can include an insert stop surface 104, for contact with the slot radial stop surface 46. The insert stop surface 104 can be closer to the insert upper surface 86 than to insert lower surface 86. The insert stop surface 104 can be planar. It is understood that in a double-ended cutting insert, such as seen the figures, both opposite end surfaces 90 are provided with a recessed portion 100 having a key surface 102 and a stop surface 104.

In the assembled state of the rotary slot cutting tool 20, the cutting insert 24 is releasably and resiliently clamped in the insert receiving slot 38 by the resilient clamping member 34. The slot clamping member abutment surface 42 abuts the insert upper abutment surface 84a. The slot lower jaw abutment surface 44 abuts the insert lower abutment surface 86a. As is known, the slot clamping member abutment surface 42 and/or the slot lower jaw abutment surface 44 can include two or more spaced apart abutment sub-surfaces and thus each may not literally be a single abutment surface. In this non-limiting example shown in the drawings (e.g. FIG. 5, the slot lower jaw abutment surface 44 includes two longitudinally spaced apart abutment sub-surfaces. The slot radial stop surface 46 abuts the insert stop surface 104.

To extract the cutting insert 24 from the insert receiving slot 38 the key 52 can be used. The key 52 has two prongs, the displacement prong 51a and the pivot prong 51b. Simultaneously, the displacement prong 51a is inserted into the slot key portion 50 and the pivot prong 51b is inserted into the pivot prong hole 31. The key 52 is then pivoted about the pivot prong 51b so that the displacement prong 51a urges the cutting insert 24 out of the insert receiving slot 38, along the insert receiving slot axis C.

It is noted that by virtue of the inwardly offset insert receiving slot 38, the cutter portion diameter DC can be reduced without the need to reduce also the shank portion diameter S. This is advantageous for performing internal slotting in a small hole. For example, for cutter portion diameter DC less than 30 mm, the cutter portion diameter DC can be less than twice the shank portion diameter DS. In particular, in a configuration having exactly three clamping portions 32, exactly three forward shank recesses 60, and exactly three non-recessed forward shank portions 62, the cutter portion diameter DC can be less than or equal to 20 mm. In such tools, the cutting insert 24 is correspondingly sized. For example, the insert length can be between 6 mm to 7 mm, the insert width can be between 1.5 mm to 2.5 mm and the insert height can be between 2 mm to 3 mm.

It is further noted that, by virtue of the insert receiving slot 38 being inwardly offset, the coolant channel exit 82 is located in the vicinity of the cutting edge 96 of the active cutting portion 94a.

It is yet further noted that, by virtue of the cutting insert 24 being resiliently clamped in the insert receiving slot 38, the cutting insert 24 can be devoid of a through hole for a retaining screw. It is yet further noted that by virtue of positioning the insert key surface 102 in the insert recessed portion 100 of the insert end surface 90, the size of the slot key portion 50 of any given the insert receiving slot 38 can be reduced. This is advantageous in small diameter tools where otherwise the slot key portion 50 would be close enough to adjacent clamping portions 32 to detrimentally affect their clamping abilities.

Although the subject matter of the present application has been described to a certain degree of particularity, it should be understood that various alterations and modifications could be made without departing from the spirit or scope of the invention as hereinafter claimed.

What is claimed is:

1. A slotting tool body (22), having a body central axis (B) that defines opposite forward and rearward directions (DF, DR) and about which the slotting tool body (22) is rotatable in a rotational direction (R), the slotting tool body (22) comprising:
   a disc-like cutter portion (26) comprising a resilient clamping portion (32) having:
      a peripherally disposed insert receiving slot (38); and
      a resilient clamping member (34) and a lower jaw member (36) which oppose each other and are spaced apart from one another by the insert receiving slot (38), the resilient clamping member (34) being arranged rotationally ahead of the lower jaw member (36) and configured to resiliently retain a cutting insert (24) in the insert receiving slot (38); and
   a shank portion (56) projecting rearwardly from the cutter portion (26), the shank portion (56) comprising a shank peripheral surface (58) which extends circumferentially about the body central axis (B) and a forward shank recess (60) recessed in, and opening out to, the shank peripheral surface (58) adjacent to the cutter portion (26); wherein:
      a radially inward portion of the insert receiving slot (38) merges in the rearward direction ($D_R$) with the forward shank recess (60) and
      the forward shank recess (60) is axially rearward of the resilient clamping member (34), along the body central axis (B).

2. The slotting tool body (22), according to claim 1, wherein the cutter portion (26) and the shank portion (56) are integrally formed so that the slotting tool body (22) has a unitary, one-piece construction.

3. The slotting tool body (22), according to claim 1, wherein the shank portion (56) comprises a peripherally disposed non-recessed forward shank portion (62) that is circumferentially adjacent the forward shank recess (60) and axially adjacent the cutter portion (26).

4. The slotting tool body (22), according to claim 3, wherein:
   the cutter portion (26) further comprises at least one additional resilient clamping portion (32) to form a plurality of clamping portions (32) that are angularly spaced apart from each other;
   the shank portion (56) further comprises at least one additional forward shank recess (60) to form a plurality of forward shank recesses (60) that are angularly spaced apart from each other;
   the shank portion (56) further comprises at least one additional non-recessed forward shank portion (62) to form a plurality of non-recessed forward shank portions (62) that are angularly spaced apart from each other, each non-recessed forward shank portion (62) being located between two circumferentially adjacent forward shank recesses (60); and
   a radially inward portion of each insert receiving slot (38) merges in the rearward direction ($D_R$) with a respective forward shank recess (60).

5. The slotting tool body (22), according to claim 3, wherein, in a direction along the body central axis (B);
an imaginary radius line extending between the body central axis (B) and a furthest portion on the non-recessed forward shank portion (62) defines a shank portion radius (RS) of a shank portion circle (CS) that is centered at the body central axis (B) and that has a shank portion diameter (DS); and
the cutter portion (26) defines a circumscribed cutter portion circle (CC) that is centered at the body central axis (B) and that has a cutter portion diameter (DC).

6. The slotting tool body (22), according to claim 5, wherein in a direction along the body central axis (B), the shank portion circle (CS) intersects the insert receiving slot (38).

7. The slotting tool body (22), according to claim 5, wherein:
the insert receiving slot (38) is defined by an elongated slot peripheral surface (40) comprising a slot lower jaw abutment surface (44) located on the lower jaw member (36); and
in a direction along the body central axis (B), the shank portion circle (CS) intersects the slot lower jaw abutment surface (44).

8. The slotting tool body (22), according to claim 7, wherein:
the slot peripheral surface (40) further comprises a slot clamping member abutment surface (42) located on the resilient clamping member (34); and
in a direction along the body central axis (B), the slot clamping member abutment surface (42) is located radially outside the shank portion circle (CS).

9. The slotting tool body (22) according to claim 8, wherein:
the slot peripheral surface (40) further comprises a slot radial stop surface (46) located circumferentially between the slot clamping member abutment surface (42) and the slot lower jaw abutment surface (44); and
in a direction along the body central axis (B), the slot radial stop surface (46) is located radially inside the shank portion circle (CS).

10. The slotting tool body (22), according to claim 1, wherein the forward shank recess (60) comprises a peripherally disposed recess outer gap (64) defined by a forwardly facing recess outer base surface (66) and a recess outer peripheral surface (68) extending transversely, thereto, the recess outer base surface (66) and each end of the recess outer peripheral surface (68) intersecting the shank peripheral surface (58).

11. The slotting tool body (22), according to claim 10, wherein:
the forward shank recess (60) further comprises a recess inner gap (74) defined by a forwardly facing recess inner base surface (76) and a recess inner peripheral surface (78) extending transversely thereto;
the recess inner base surface (76) intersects the recess outer peripheral surface (68); and
each end of the recess inner peripheral surface (78) intersects the recess outer peripheral surface (68).

12. The slotting tool body (22), according to claim 10, wherein the recess outer gap (64) is formed by a circumferential groove that extends in the circumferential direction.

13. The slotting tool body (22), according to claim 12, wherein in a direction along the body central axis (B), the recess outer peripheral surface (68) is concavely curved and defined by a recess outer peripheral radius (RO).

14. The slotting tool body (22), according to claim 10, wherein, in a side view of the slotting tool body (22), the recess outer peripheral surface (68) is concavely curved and defined by a peripheral side radius (RS).

15. A rotary slot cutting tool (20) comprising:
a slotting tool body (22) in accordance with claim 1; and
a cutting insert (24), releasably and resiliently clamped in the insert receiving slot (38).

16. The rotary slot cutting tool (20), according to claim 15, wherein:
the cutting insert (24) is longitudinally elongated in a direction defining an insert longitudinal axis (A), the cutting insert (24) comprising:
opposing insert upper and lower surfaces (84, 86) and an insert peripheral surface (88) extending therebetween, the insert peripheral surface (88) comprising two opposing insert end surfaces (90) connecting the insert upper and lower surfaces (84, 86) and two opposing insert side surfaces (92) also connecting the insert upper and lower surfaces (84, 86);
an insert longitudinal plane (P1) containing the insert longitudinal axis (A), passing between the insert side surfaces (92), and intersecting the insert upper and lower surfaces (84, 86) and also intersecting the opposite insert end surfaces (90); and
a cutting portion (94a) located at one end of the cutting insert (24), the cutting portion (94a) comprising a cutting edge (96) formed at the intersection of the insert upper surface (84) and one of the two insert end surfaces (90); wherein:
the insert end surface (90) opposite the cutting portion (94a) comprises an insert recessed portion (100) comprising an insert key surface (102) which is closer to the insert lower surface (86) than to the insert upper surface (84), the insert key surface (102) being configured for abutment by a displacement prong (51b) of a key (52) used for extracting the cutting insert (24) from the insert receiving slot (38).

17. The rotary slot cutting tool (20), according to claim 16, wherein in a side view of the cutting insert (24), the insert key surface (102) is concavely curved.

18. The rotary slot cutting tool (20), according to claim 16, wherein the insert key surface (102) is located entirely below an insert median plane (M) that extends midway between the insert upper and lower surfaces (84, 86) and contains the insert longitudinal axis (A).

19. The rotary slot cutting tool (20), according to claim 16, wherein the insert end surface (90) opposite the cutting portion (94a) further comprises an insert stop surface (104) which is closer to the insert upper surface (84) than to insert lower surface (86), the insert stop surface (104) being planar.

20. The rotary slot cutting tool (20), according to claim 16, wherein:
the cutting insert (24) comprises an additional cutting portion (94a) forming two cutting portions (94a, 94b), the two cutting portions (94a, 94b) being formed at opposite ends of the cutting insert (24).

21. The rotary slot cutting tool (20), according to claim 20, wherein:
each insert cutting portion (94a, 94b) comprises two insert lateral extensions (98a, 98b) which project laterally from opposite sides of the cutting insert (24) in a direction away from the insert longitudinal plane (P1), and upon which the cutting edge (96) extends;
the two insert lateral extensions (98a, 98b) comprise a wide and a narrow insert lateral extension (98a, 98b), the wide insert lateral extension (98a) being longer than the narrow insert lateral extension (98b) in a direction perpendicular to the insert longitudinal plane (P1); and the wide insert lateral extensions (98a) are located on opposite sides of the insert longitudinal plane (P1).

22. The rotary slot cutting tool (20), according to claim 21, wherein:

the two cutting portions (94a, 94b) comprise an active cutting portion (94a) and a non-active cutting portion (94b), the cutting edge (96) of the active cutting portion (94a) being located beyond the radial extent of the cutter portion (26); and the wide insert lateral extension (98a) of the active cutting portion (94a) is the axially forwardmost of the two insert lateral extensions (98a, 98b) with respect to the axial direction.

23. The rotary slot cutting tool (20), according to claim 15, wherein the insert receiving slot (38) comprises a slot insert portion (48) defined by an insert profile (IP) of the cutting insert (24) in a direction along the body central axis (B); and a radially inward portion of the slot insert portion (48) merges in the rearward direction (DR) with the forward shank recess (60).

24. The slotting tool body (22), according to claim 1, wherein:

in a forward view of the slotting tool body (22), in a direction along the body central axis (B), the shank portion (56) is partially visible through the insert receiving slot (38).

25. The slotting tool body (22), according to claim 1, wherein the resilient clamping member (34) has a rearward facing surface (34a) which faces the forward shank recess (60).

26. A slotting tool body (22), having a body central axis (B) that defines opposite forward and rearward directions (DF, DR) and about which the slotting tool body (22) is rotatable in a rotational direction (R), the slotting tool body (22) comprising:

a disc-like cutter portion (26) comprising a plurality of angularly spaced apart cutter sectors (27) with a resilient clamping portion (32) formed between each adjacent pair of cutter sectors (27), each resilient clamping portion having a resilient clamping member (34) and a lower jaw member (36) spaced apart from one another by a peripherally disposed insert receiving slot (38) with the resilient clamping member (34) being arranged rotationally ahead of the lower jaw member (36) and configured to resiliently retain a rutting insert (24) in the insert receiving slot (38), each cutter sector (27) having a lower jaw member (36) formed at a rotationally leading end (27a) thereof and a resilient clamping member (34) at a rotationally trailing end (27b) thereof;

the cutter sectors (27) being circumferentially spaced apart from one another by the insert receiving slot (38) of one of the resilient clamping portions (32), with the resilient clamping member (34) of said one resilient clamping portion formed on a rotationally leading cutter sector (27) and the lower jaw member (36) of said one resilient clamping portion formed on a rotationally trailing cutter sector (27); and a shank portion (56) projecting rearwardly from the cutter portion (26), the shank portion (56) comprising a shank peripheral surface (58) which extends circumferentially about the body central axis (B) and a forward shank recess (60) recessed in, and opening out to, the shank peripheral surface (58) adjacent to the cutter portion (26); wherein:

a radially inward portion of the insert receiving slot (38) merges in the rearward direction ($D_R$) with the forward shank recess (60).

27. The slotting tool body (22), according to claim 26, wherein:

in a forward view of the slotting tool body (22), in a direction along the body central axis (B), the shank portion (56) is partially visible through the insert receiving slot (38).

* * * * *